W. McLAIN.
PISTON ROD STUFFING BOX AND LUBRICATOR.
APPLICATION FILED APR. 26, 1910.
978,611.
Patented Dec. 13, 1910.
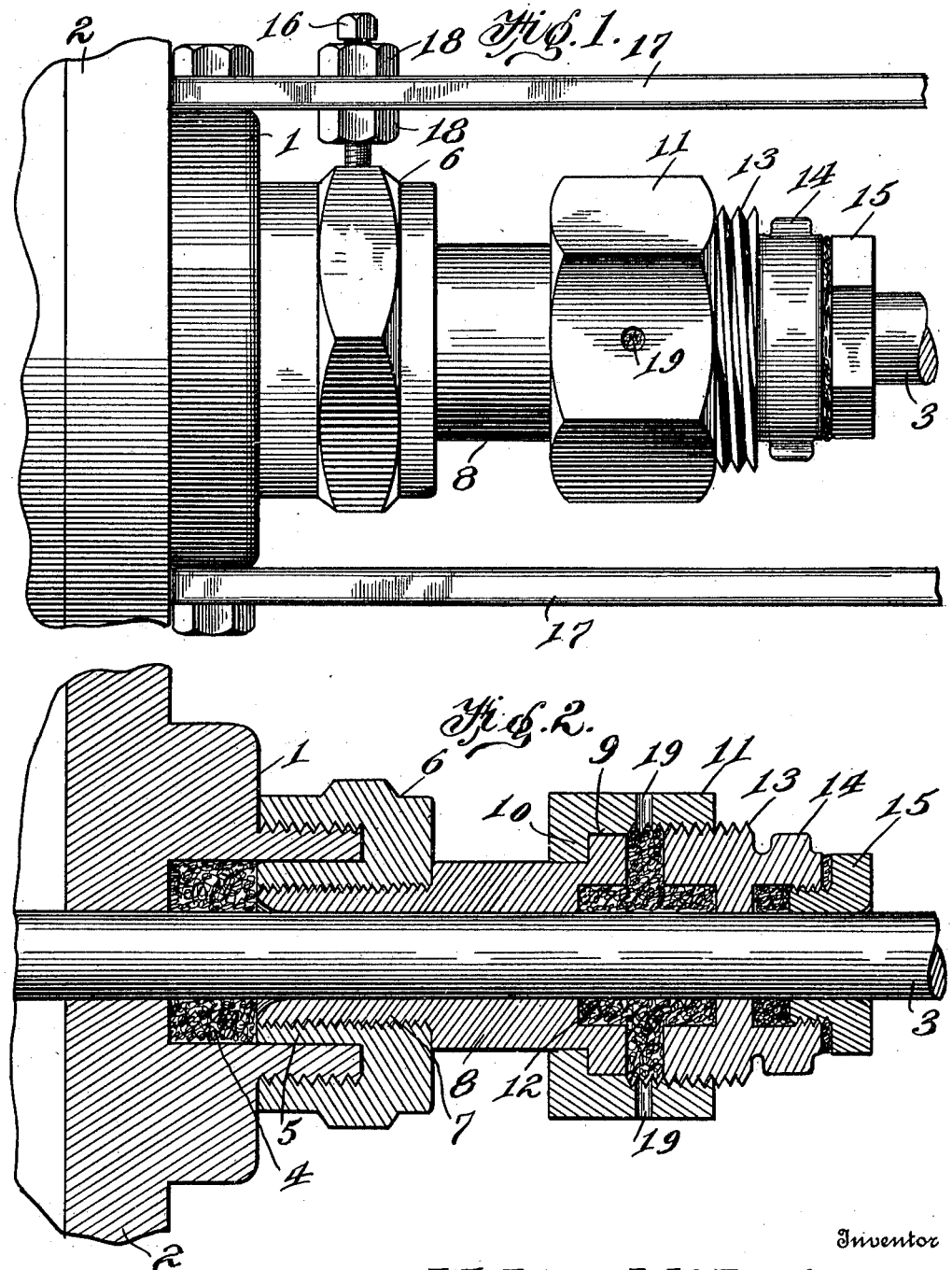
Witnesses
H. H. Lybrand
V. B. Hillyard
Inventor
Walter McLain
By Victor J. Evans
Attorney

UNITED STATES PATENT OFFICE.

WALTER McLAIN, OF SPIRITWOOD, NORTH DAKOTA.

PISTON-ROD STUFFING-BOX AND LUBRICATOR.

978,611.     Specification of Letters Patent.     Patented Dec. 13, 1910.

Application filed April 26, 1910. Serial No. 557,812.

*To all whom it may concern:*

Be it known that I, WALTER MCLAIN, a citizen of the United States, residing at Spiritwood, in the county of Stutsman and State of North Dakota, have invented new and useful Improvements in Piston-Rod Stuffing-Boxes and Lubricators, of which the following is a specification.

The present invention provides means whereby a close joint may be maintained between a reciprocating part such as a piston rod and the guide through which the same operates and whereby said rod may be lubricated to prevent heating and excessive wear and to reduce the friction to the smallest amount possible, said lubricator being of such construction as to prevent any waste of lubricant and insure a thorough and effective oiling of the piston rod.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a side view of an end portion of a cylinder provided with a stuffing box and lubricator embodying the invention. Fig. 2 is a central longitudinal section of the parts shown in Fig. 1.

Corresponding and like parts are referred to in the following description, and indicated in all the views of the drawings, by the same reference characters.

The numeral 1 indicates the guide or boss at one end of an engine cylinder 2, through which a piston rod 3 is adapted to operate. The guide or boss 1 is enlarged to form a stuffing box in which loose material 4 is placed. The gland 5 is adapted to enter the stuffing box and compress the material 4 and may constitute a part of the packing or gland nut 6, which is constructed to make screwthread connection with the guide or boss 1. A nipple 7 is threaded into the gland 5 and projects a short distance therefrom. A sleeve 8 is connected with the projecting end of the nipple 7 by means of a screwthread joint and is provided at its outer end with a shoulder 9, which engages an inner shoulder 10 of a nut 11 which is loose upon the sleeve 8. The nut 11 constitutes a chamber in which is placed a lubricant, the latter being absorbed by loose material 12, such as cotton waste, thereby preventing a too free distribution of the oil while at the same time insuring thorough lubrication of the piston rod 3. A cap nut 13 is threaded into the nut 11 and its outer end is reduced and chambered to receive packing material 14, which is confined by means of a jam nut 15.

The packing or gland nut 6 is prevented from becoming loose by means of a lock screw 16, which is threaded into one of the guides 17 upon which the cross head is slidably mounted. The lock screw 16 is held in the adjusted position by means of jam nuts 18. The chambered nut 11 is provided in its sides with openings 19, which admit of lubricant being supplied to the absorbent material 12 arranged therein. By compressing the material 12 more or less by means of the cap nut 13 the amount of lubricant supplied to the piston rod may be controlled. The loose material 12 acts as a swab or wiper and also as a distributer for the lubricant, thereby preventing excessive lubrication of the piston rod, while at the same time insuring an effective oiling thereof to prevent heating of the piston rod and a binding of the same in the guide or boss 1.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a piston rod stuffing box the combination of a chambered boss adapted to receive packing material, a gland for compressing the packing material in the boss, a nut carrying said gland and making screwthread connection with said boss, a nipple fitted to said gland, a sleeve connected with said nipple and having an outer shoulder, a chambered nut mounted upon said sleeve and having an inner shoulder to engage the outer shoulder of said sleeve, said nut being designed to receive packing material and provided with oil openings, and a cap nut threaded into said chambered nut.

2. In a piston rod stuffing box the combination of a chambered boss adapted to receive packing material, a gland for compressing the packing material in the boss, a nut carrying said gland and making screw-thread connection with said boss, a nipple fitted to said gland, a sleeve connected with said nipple and having an outer shoulder, a chambered nut mounted upon said sleeve and having an inner shoulder to engage the outer shoulder of said sleeve, said nut being designed to receive packing material and provided with oil openings, a cap nut threaded into said chambered nut, said cap nut having its outer end reduced and chambered to receive packing material, and a jam nut for compressing said material therein.

In testimony whereof I affix my signature in presence of two witnesses.

WALTER McLAIN.

Witnesses:
 JOHN KNAUF,
 ANNA L. BLEWETT.